No. 667,018. Patented Jan. 29, 1901.
F. L. KELLOGG.
DIAL FOR SPRING SCALES.
(Application filed Apr. 5, 1900.)
(No Model.)
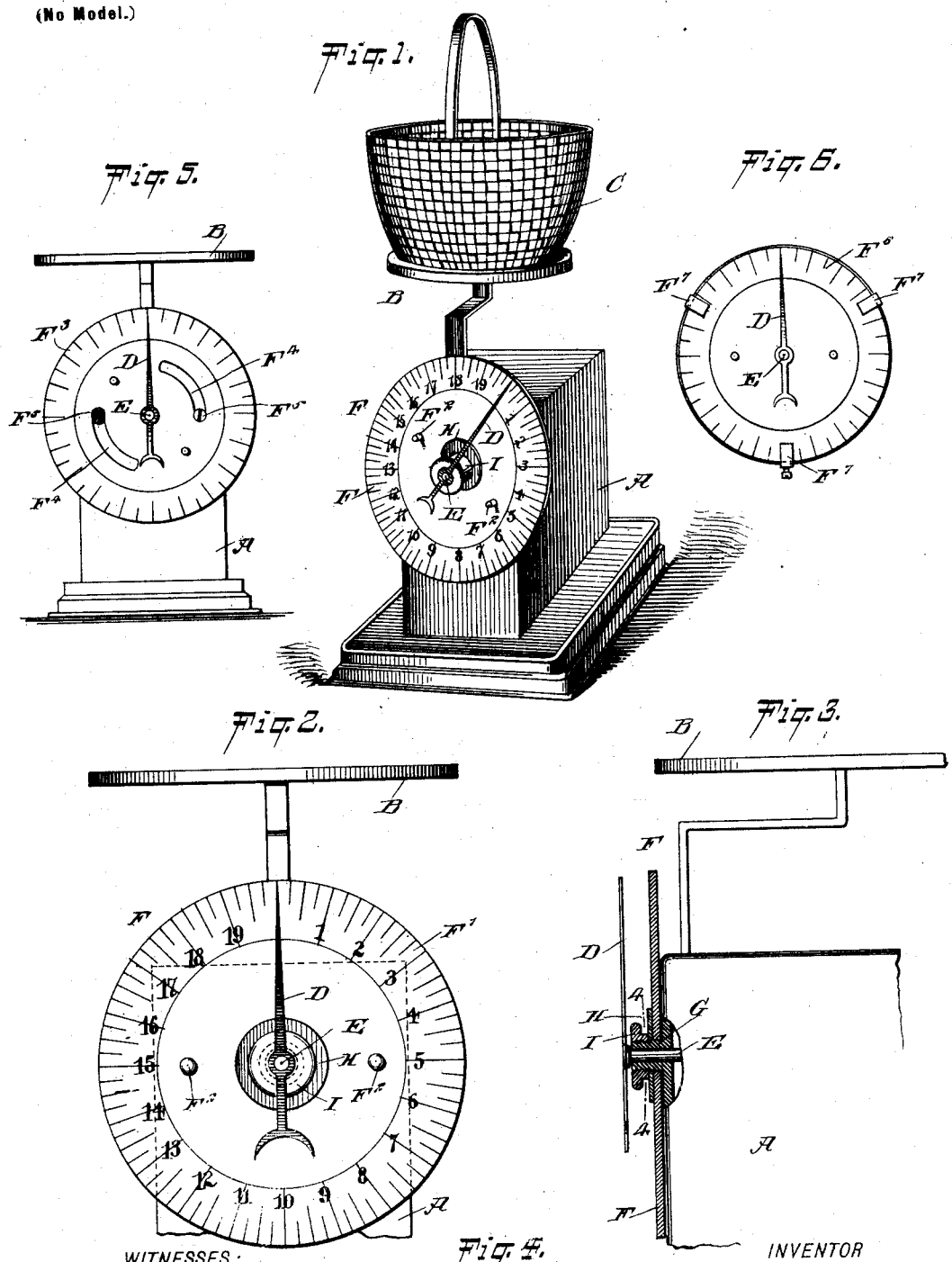
WITNESSES:
William P. Goebel.
Rev. G. Hosted
INVENTOR
F. L. Kellogg
BY
ATTORNEYS
THE NORRIS PETERS CO., PHOTO-LITHO., WASHINGTON, D. C.

UNITED STATES PATENT OFFICE.

FLORENTINE LESLIE KELLOGG, OF SANTA BARBARA, CALIFORNIA.

DIAL FOR SPRING-SCALES.

SPECIFICATION forming part of Letters Patent No. 667,018, dated January 29, 1901.

Application filed April 5, 1900. Serial No. 11,667. (No model.)

*To all whom it may concern:*

Be it known that I, FLORENTINE LESLIE KELLOGG, a citizen of the United States, and a resident of Santa Barbara, in the county of Santa Barbara and State of California, have invented certain new and useful Improvements in Weighing-Scales, of which the following is a full, clear, and exact description.

The object of the invention is to provide certain new and useful improvements in weighing-scales whereby the scales indicate the weight of the goods contained in a receptacle placed with the goods in weighing position on the scales.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement with the empty receptacle in position and the dial shifted ready for weighing the goods placed in the receptacle. Fig. 2 is an enlarged front view of the same with the dial in a normal position. Fig. 3 is a side elevation of the same with part in section. Fig. 4 is a sectional front view of the same on the line 4 4 in Fig. 3. Fig. 5 is a face view of a modified form of the improvement with part in section, and Fig. 6 is a similar view of another modified form of the improvement.

The weighing-scales illustrated in Figs. 1, 2, and 3 have a casing A, containing the usual weighing mechanism, (not shown,) a platform B extending above the casing for receiving a receptacle C, adapted to contain the goods or articles to be weighed. The weighing mechanism is also provided with the usual pointer D, secured on a spindle E and indicating on the graduation F' on a dial F, mounted to turn on a bearing G concentric with the spindle E and secured to or forming part of the casing A. A washer H engages the front face of the dial F, and a nut I, screwing on the threaded end of the bearing G, serves to force the washer H with more or less force in contact with the dial F, so as to allow turning of the latter on its bearing, but prevent accidental turning of said dial. On the front face of the dial F are formed small projections $F^2$ out of the path of the pointer D and adapted to be taken hold of by the operator to turn the dial on its bearing for the purpose presently to be described.

When it is desired to weigh, for instance, potatoes contained in the receptacle C, the empty receptacle is first placed on the platform B, the dial F being in a normal zero position, as indicated in Fig. 2. The weight of the receptacle C causes the pointer D to turn and indicate on the graduation F' the weight of said receptacle, and when this is done the operator turns the dial F so as to bring the zero-mark to the pointer D, as illustrated in Fig. 1. The receptacle C is now filled with potatoes or other goods to be weighed, and the pointer D is thereby caused to turn, the reading on the graduation F' at the point where the pointer comes to rest indicating the weight of the potatoes placed in the receptacle C.

From the foregoing it is evident that by shifting the dial F as described after the empty receptacle is in position the weight of the receptacle is automatically deducted from the total weight of the receptacle and its contents.

I do not limit myself to the particular mounting described of the dial on the casing A, as it is evident that the same may be varied. For instance, as shown in Fig. 5, the bearing G is dispensed with and the dial $F^3$ is formed with segmental slots $F^4$, engaged by screws or pins $F^5$, secured to the casing A of the scales. By this arrangement the dial can be turned on the pins a sufficient distance for the weights of ordinary receptacles used on the scales.

As shown in Fig. 6, the dial $F^6$ is mounted in bearings $F^7$, secured to the casing and engaging the periphery and face of the dial, so that the latter can be turned for the purpose previously described. It is expressly understood that the weighing mechanism, the pointer, and platform of ordinary scales are not disturbed in the least, and only the dial is mounted to be manually turned, for the purpose above explained.

Having thus fully described my invention, I claim as new and desire to secure by Letters Patent—

1. A weighing-scale, comprising a casing, a platform, a spindle projecting from the casing, a pointer on the end of the spindle, a fixed bearing on the spindle and having a screw-threaded outer end, a dial mounted to turn upon the bearing and upon which the pointer indicates, a washer on the bearing and engaging the dial, and a nut screwing on the said bearing and by means of which the washer can be forced with more or less pressure against the dial, substantially as described.

2. The combination with a casing, the pointer-spindle, and pointer thereon, of a bearing on the said spindle and having a screw-threaded outer end, a dial upon which the pointer indicates, mounted on the bearing and provided with projections on its front face, a washer on the bearing and engaging the dial, and a nut screwing on the said bearing, whereby the dial will be so mounted that it can be readily turned, but prevented from accidental turning, substantially as described.

In testimony whereof I have signed my name to this specification in the presence of two subscribing witnesses.

FLORENTINE LESLIE KELLOGG.

Witnesses:
JEROME T. JOHNSON,
DARWIN W. PIERCE.